March 9, 1926.  
A. H. WOODWARD  
CHECK WRITER  
Filed Oct. 22, 1924  
1,575,885  
12 Sheets-Sheet 1

Witnesses:  
W. P. Kilroy  
Harry R. L. White

Inventor:  
Arthur H. Woodward  
By Brown, Boettcher & Diener  
Attys

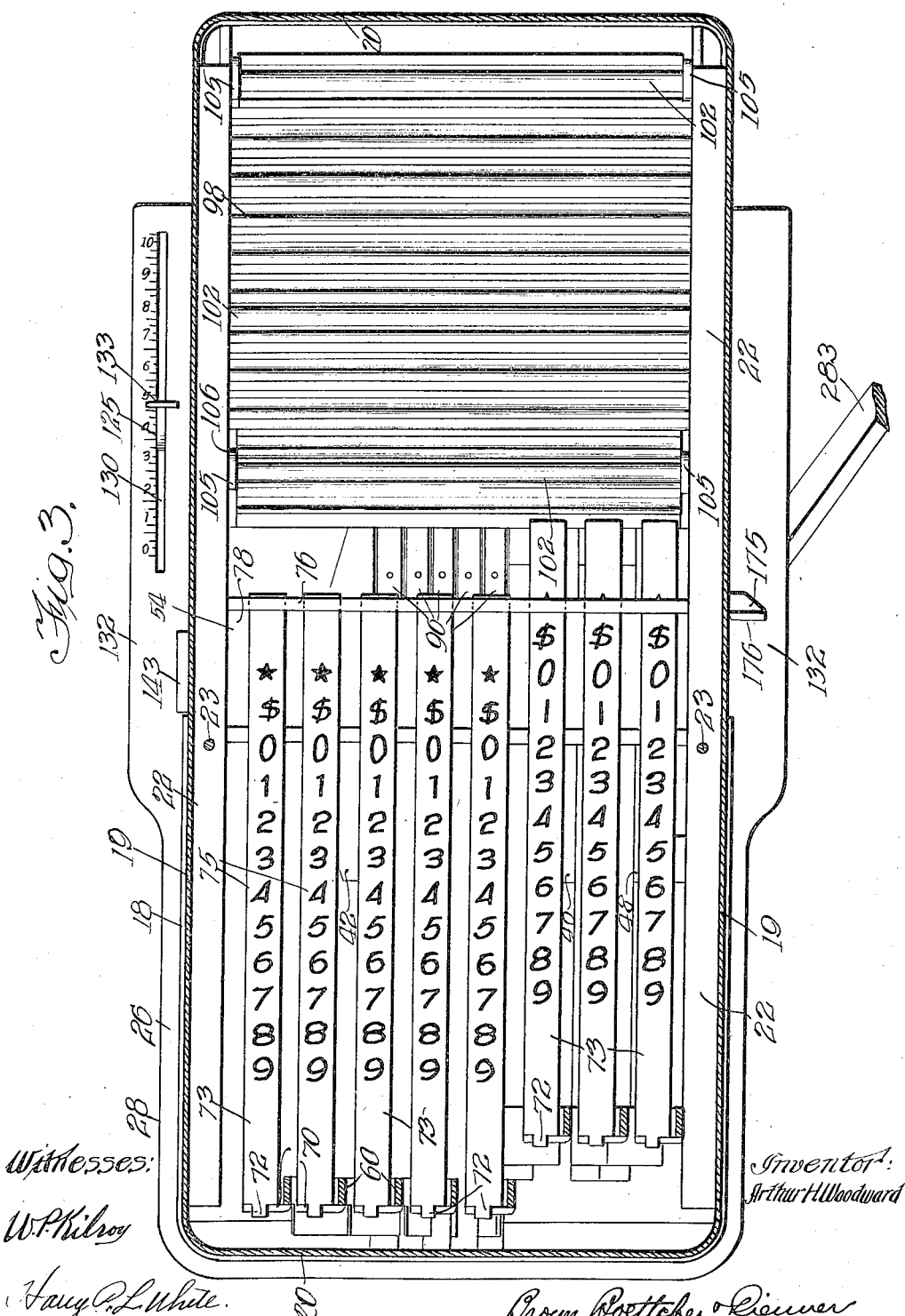

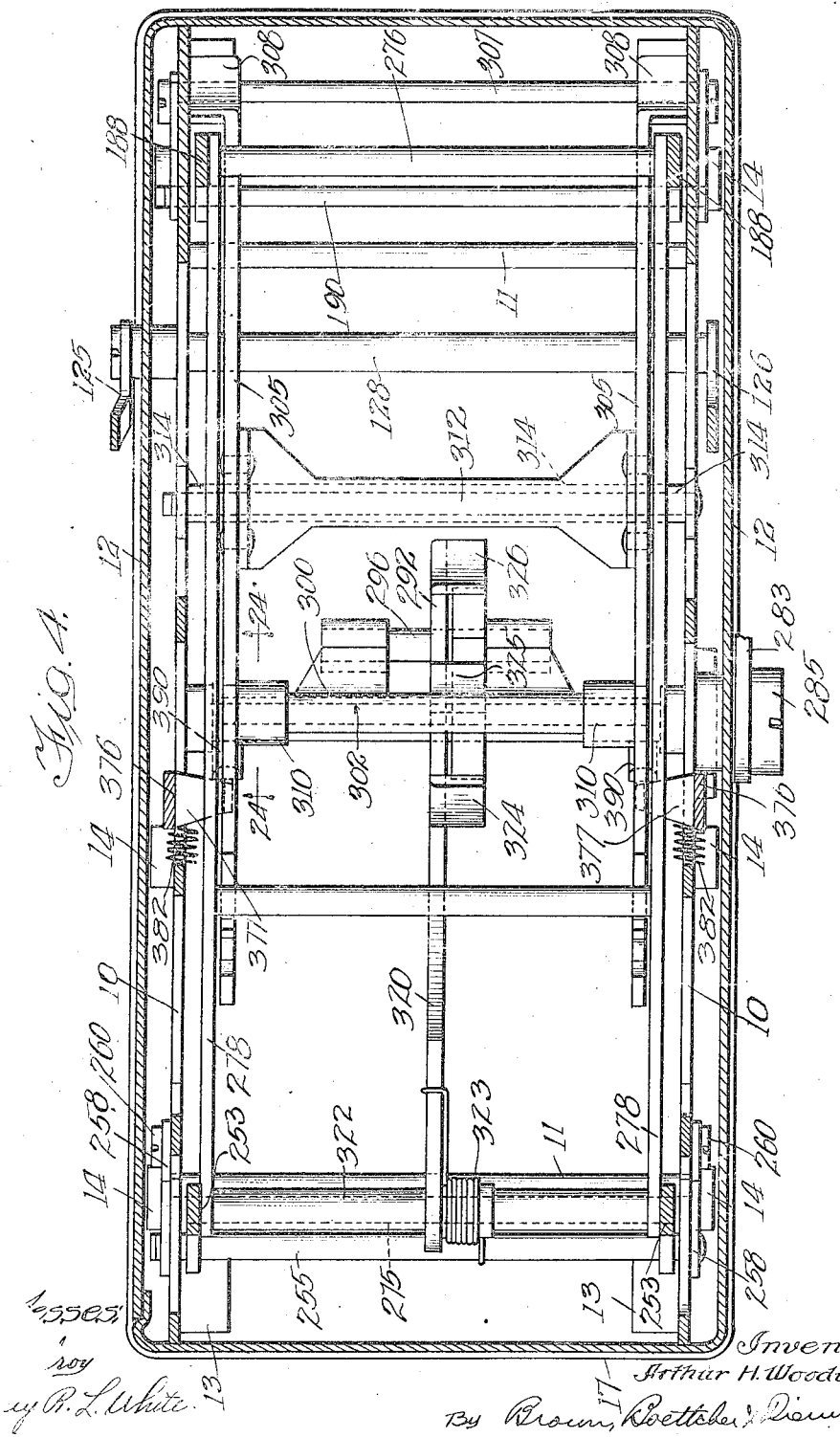

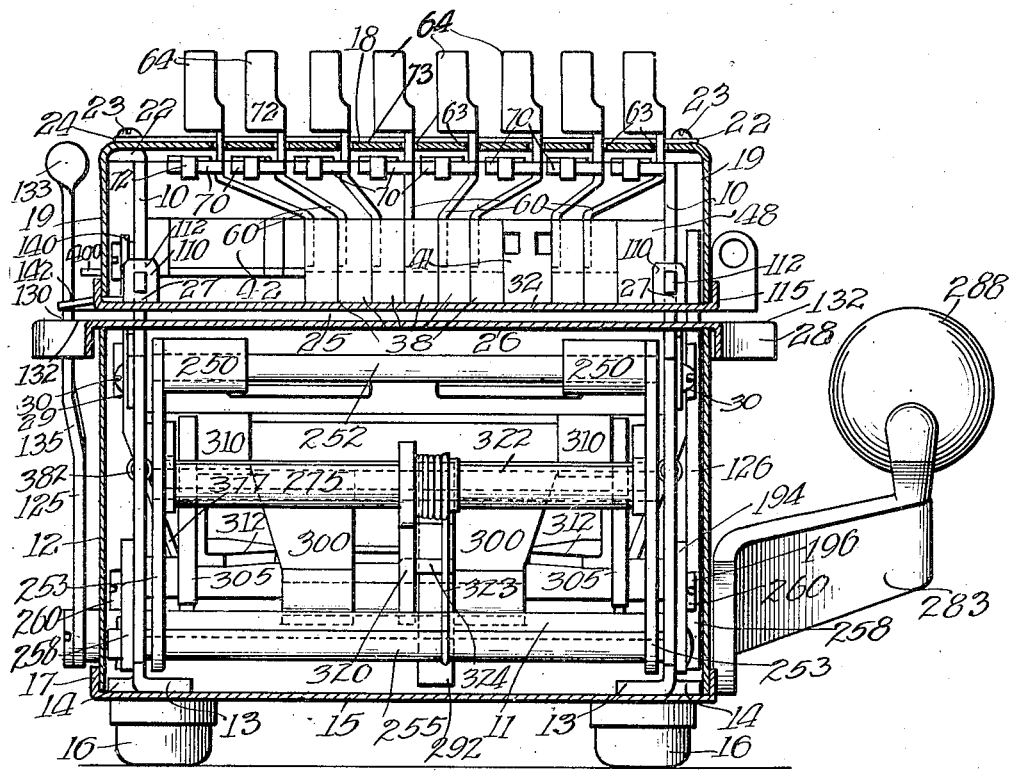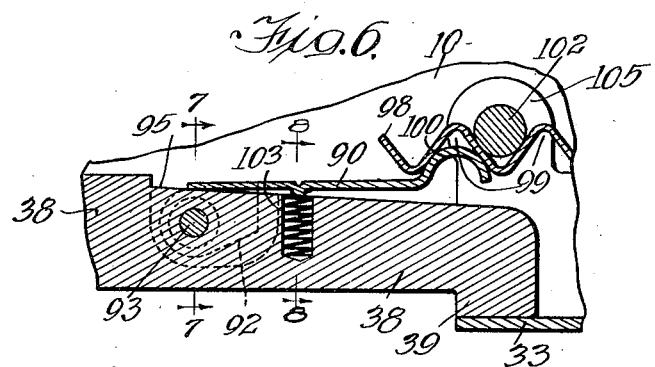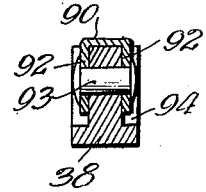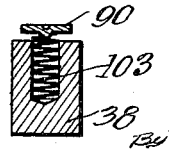

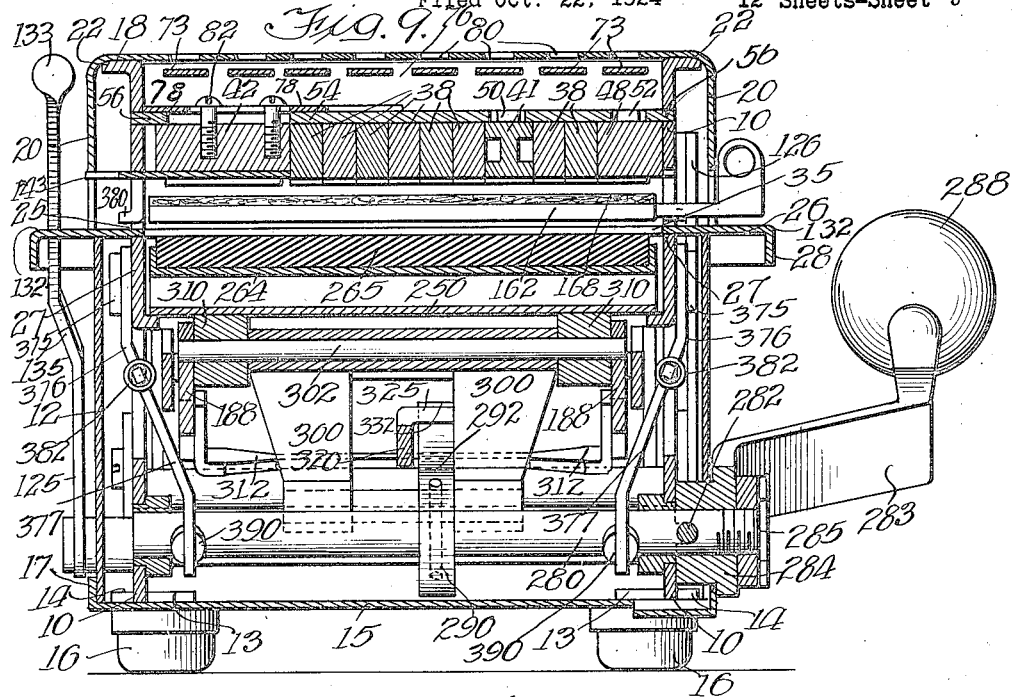
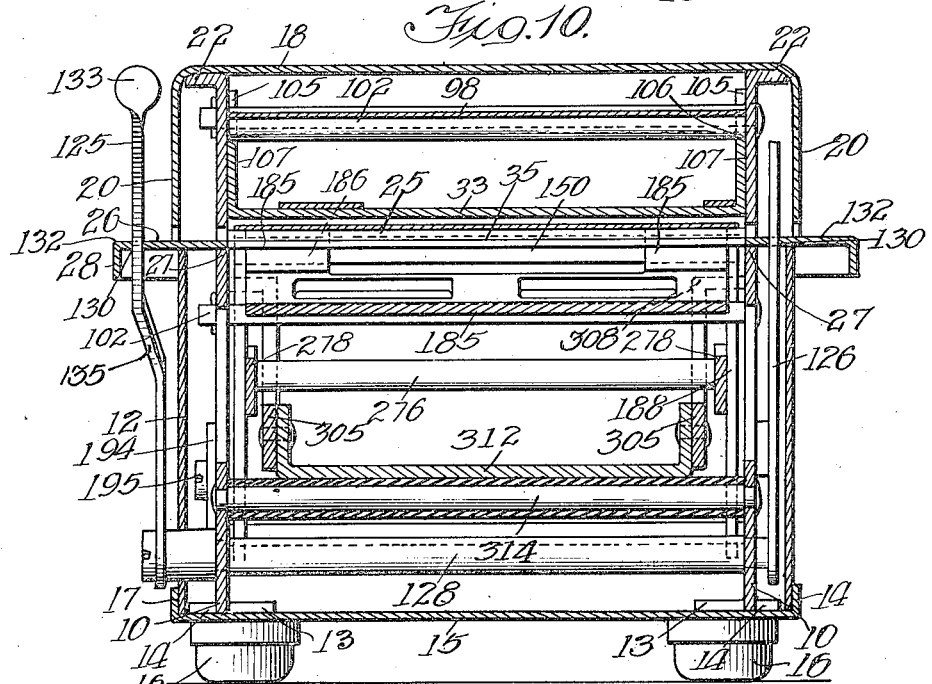

March 9, 1926.

A. H. WOODWARD

CHECK WRITER

Filed Oct. 22, 1924    12 Sheets-Sheet 6

Witnesses:
W. F. Kilroy
Harry R. L. White

Inventor:
Arthur H Woodward
By Brown, Boettcher & Dienner
Attys

March 9, 1926.

A. H. WOODWARD 1,575,885

CHECK WRITER

Filed Oct. 22, 1924    12 Sheets-Sheet 7

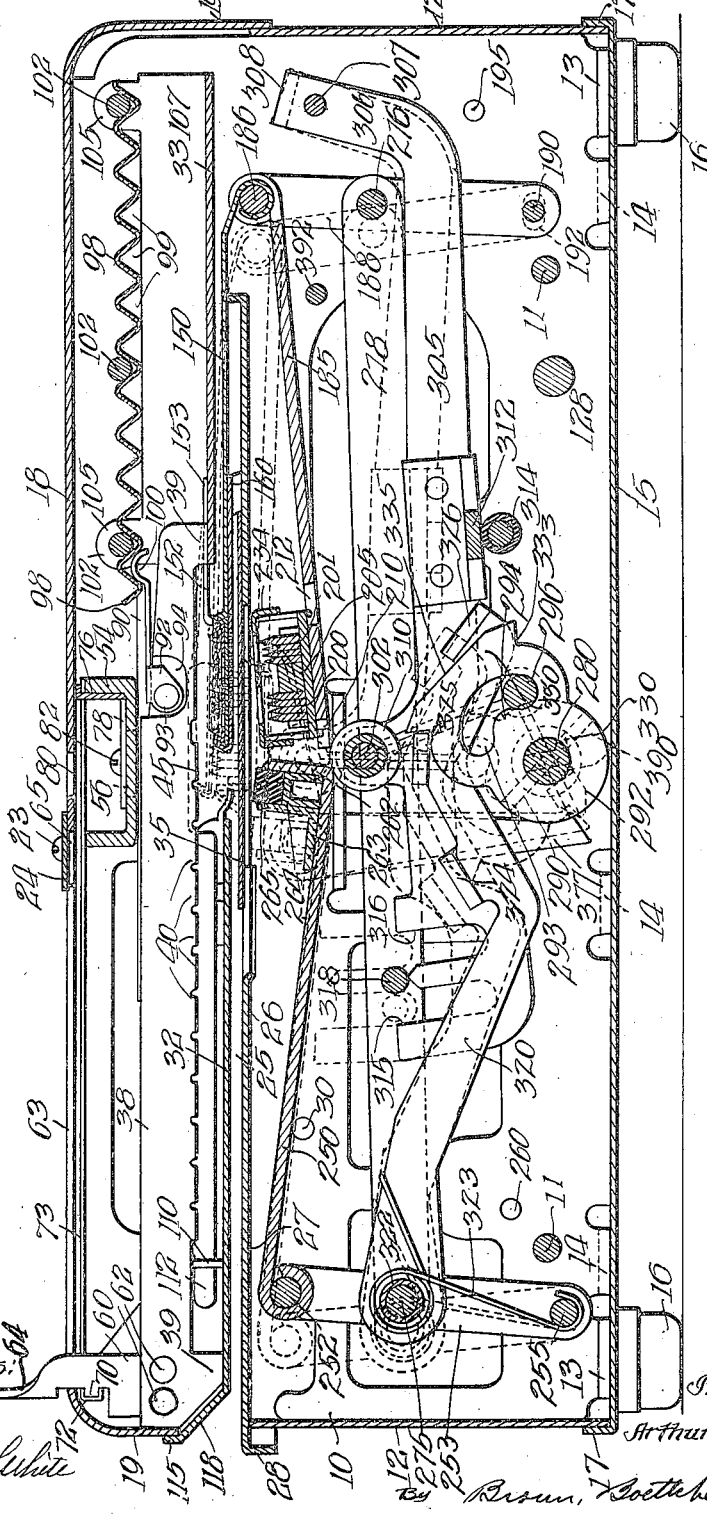

March 9, 1926. 1,575,885

A. H. WOODWARD

CHECK WRITER

Filed Oct. 22, 1924  12 Sheets-Sheet 9

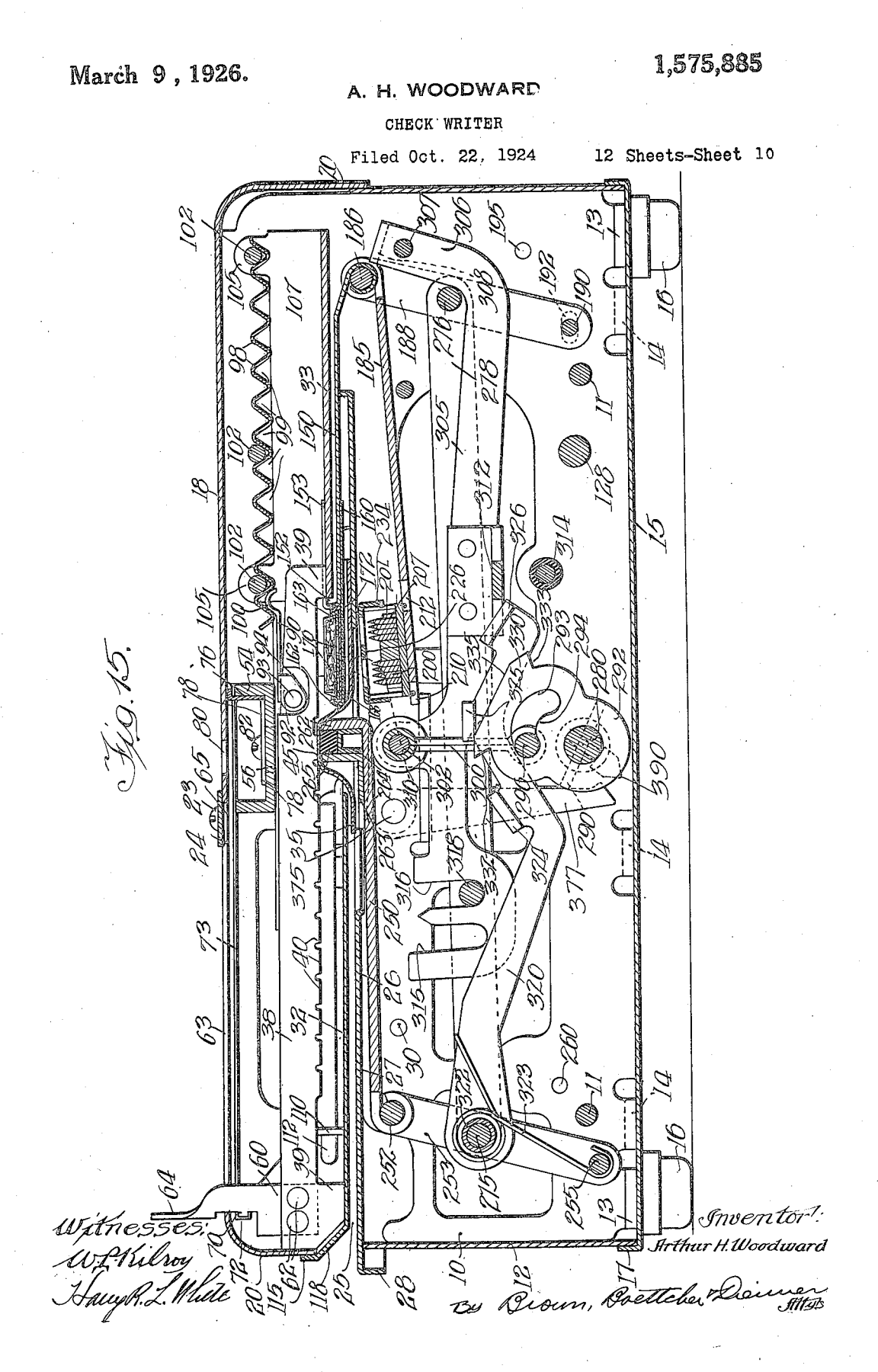

March 9, 1926.  1,575,885
A. H. WOODWARD
CHECK WRITER
Filed Oct. 22, 1924    12 Sheets-Sheet 10

Fig. 15.

Witnesses:
W. F. Kilroy
Harry R. L. White

Inventor:
Arthur H. Woodward
By Brown, Boettcher & Dienner
Attys

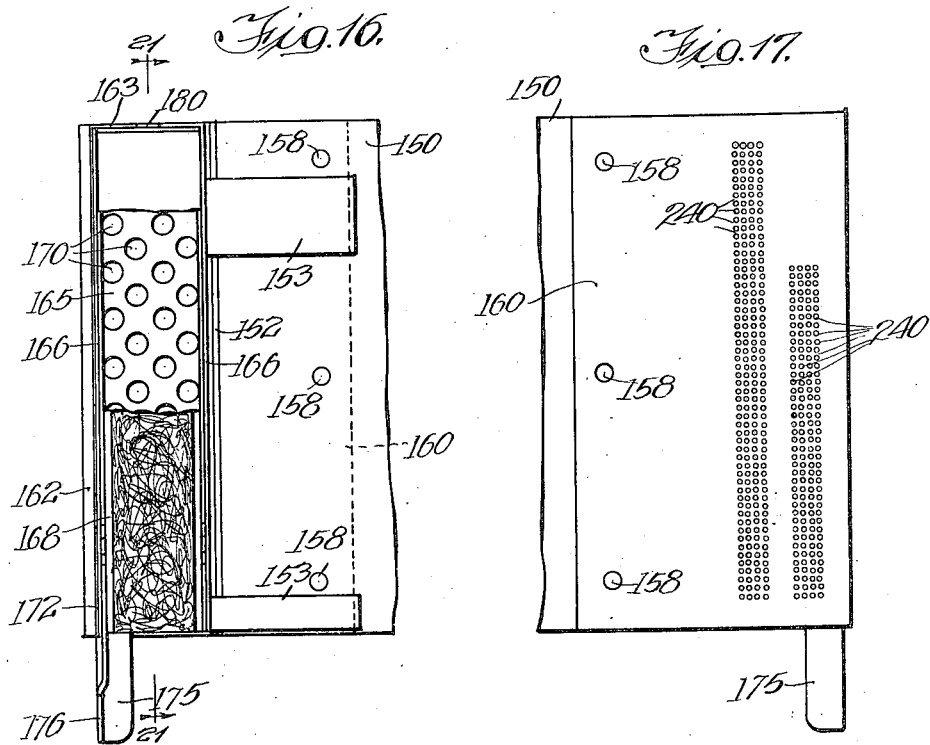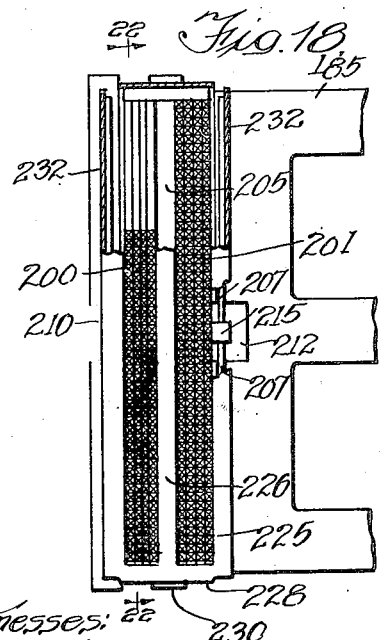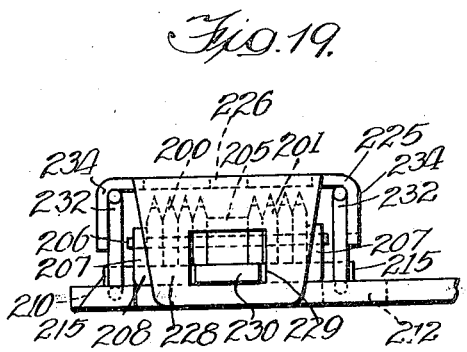

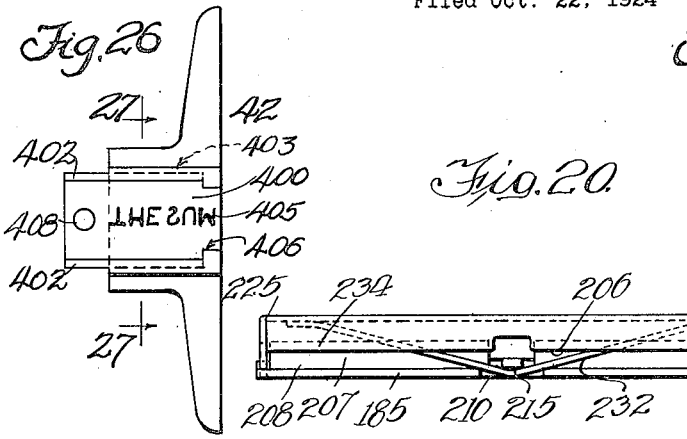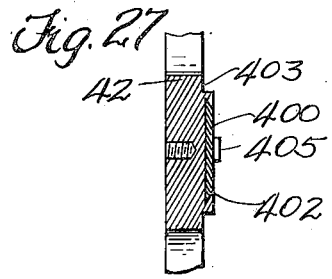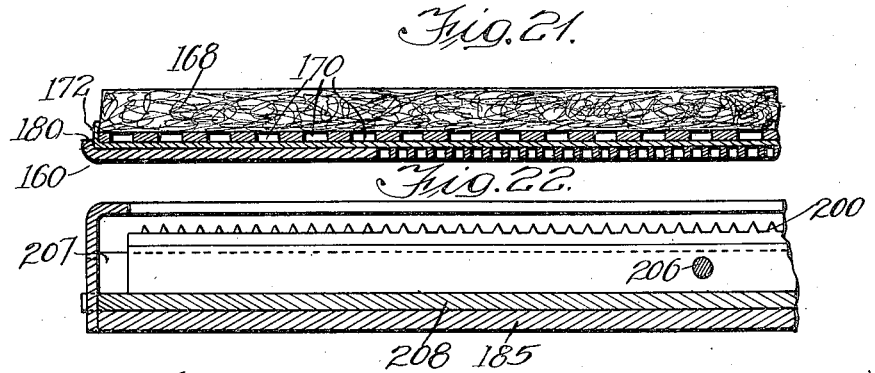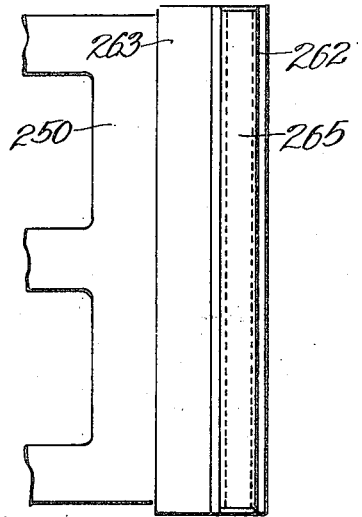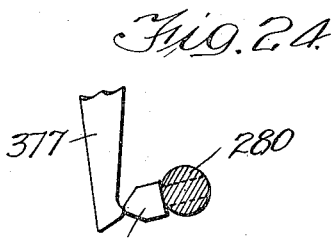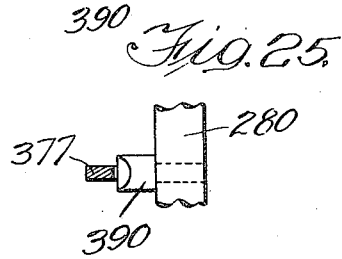

Patented Mar. 9, 1926.

1,575,885

UNITED STATES PATENT OFFICE.

ARTHUR H. WOODWARD, OF WINNETKA, ILLINOIS, ASSIGNOR TO INTERNATIONAL REGISTER CO., OF CHICAGO, ILLINOIS, A CORPORATION OF ILLINOIS.

CHECK WRITER.

Application filed October 22, 1924. Serial No. 745,047.

*To all whom it may concern:*

Be it known that I, ARTHUR H. WOODWARD, a citizen of the United States, residing at Winnetka, in the county of Cook and State of Illinois, have invented a certain new and useful Improvement in Check Writers, of which the following is a full, clear, concise, and exact description, reference being had to the accompanying drawings, forming a part of this specification.

This invention relates to check writers and more particularly to improvements in the construction and operation of check writers of the type disclosed in Patent No. 1,321,348, of November 11, 1919, to George M. Willis, and in the co-pending applications of George M. Willis, Ser. No. 481,632, filed June 30, 1921, and Ser. No. 563,229, filed May 24, 1922.

The invention is illustrated in the accompanying drawings in which

Fig. 3 is a plan view taken horizontally through the cover of the machine on substantially the line 3—3 of Fig. 2;

Fig. 4 is a plan section on substantially line 4—4 of Fig. 2;

Fig. 5 is a vertical section on line 5—5 of Fig. 2;

Fig. 6 is a detail longitudinal section through the rear end of one of the type bars showing the detent means for aligning same and holding it in adjusted position;

Fig. 7 is a vertical section on line 7—7 of Fig. 6;

Fig. 8 is a vertical section on line 8—8 of Fig. 6;

Fig. 9 is a vertical section on line 9—9 of Fig. 2;

Fig. 10 is a vertical section on line 10—10 of Fig. 2;

Fig. 11 is a vertical section through the casing and cover outside the frame of the machine, taken substantially on line 11—11 of Fig. 1;

Fig. 12 is a vertical longitudinal section on line 12—12 of Fig. 1;

Figs. 13, 14 and 15 are vertical longitudinal sections similar to Fig. 11, showing the different stages of operation;

Fig. 16 is a fragmentary top plan view of the forward end of the ink pad block assembly;

Fig. 17 is a bottom plan view of the under side of same;

Fig. 18 is a fragmentary top plan view of the forward end of the perforator block assembly;

Fig. 19 is an elevational view taken from one side of the perforator block assembly showing the mounting of the perforating means and the stripper in end elevation;

Fig. 20 is an end view of the perforator block assembly showing the mounting for the perforating means and the stripper in side elevation;

Fig. 21 is an enlarged vertical section through the ink pad carrying arm showing the mounting of the ink pad thereon;

Fig. 22 is a vertical section on line 22—22 of Fig. 18 through the perforator arm stripper and perforator mounting means showing the same in operating position below the ink pad carrying arm;

Fig. 23 is a fragmentary top plan view of the forward end of the printing block or platen assembly;

Fig. 24 is a detail section through the crank or operating shaft on substantially the line 24—24 of Fig. 4 showing the lower end of one of the arms for gripping the check and retaining it against displacement while the perforating and printing operations are being performed;

Fig. 25 is a section through the gripping arm showing the crank or operating shaft of the machine and the means on said shaft for actuating said gripping arm;

Fig. 26 is a bottom plan view of the "sum" block showing the removable "sum" plate; and Fig. 27 is a detail section on line 27—27 of Fig. 26.

Figure 1:
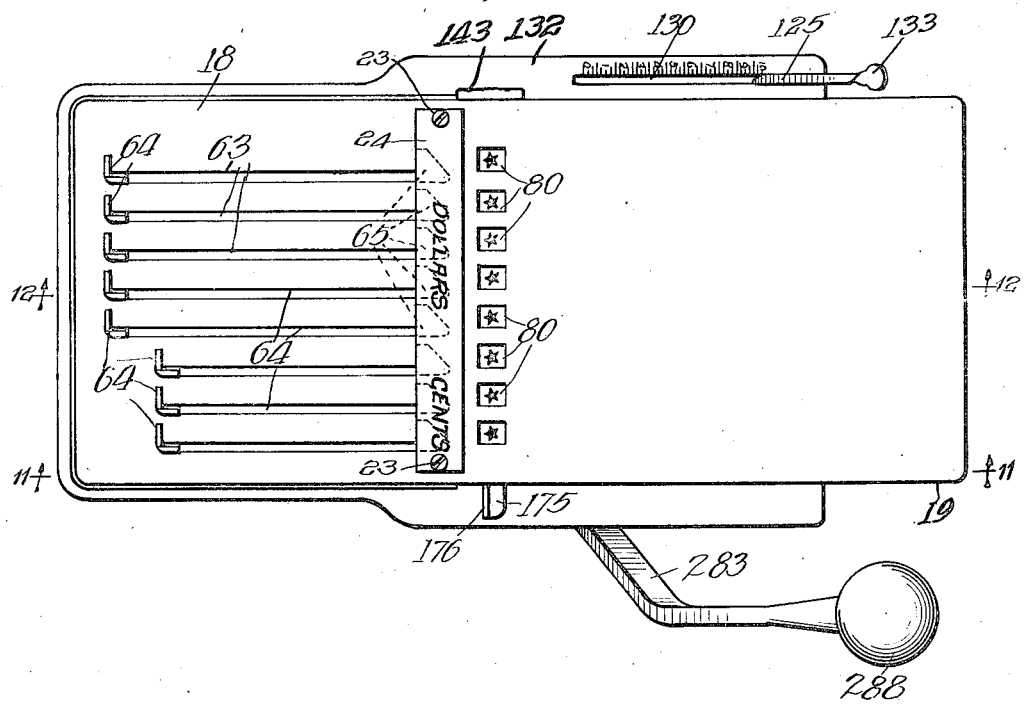
Fig. 1 is a top plan view of an embodiment of the invention.
Figure 2:
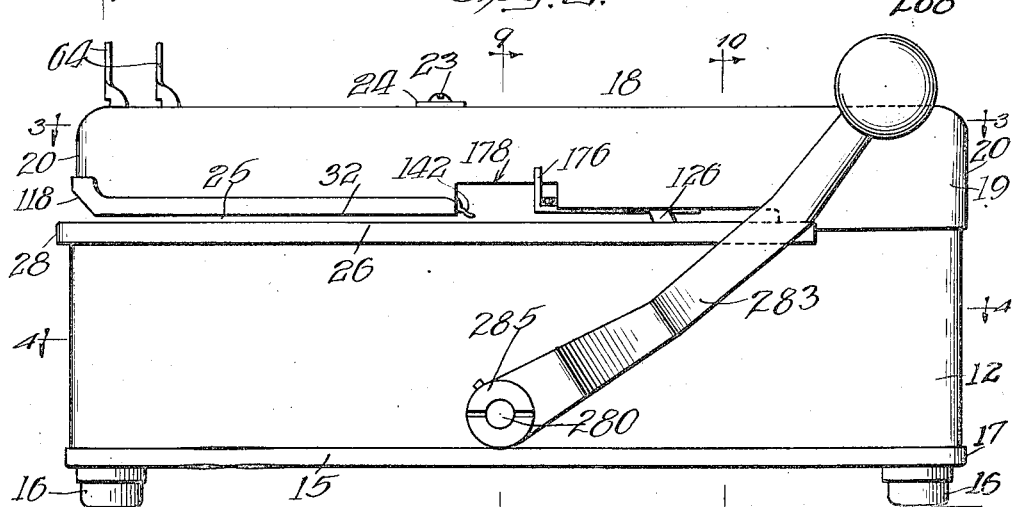
Fig. 2 is a side elevational view of the same.

The operating parts of the machine are mounted in an open frame comprising two side plates 10—10 which may be stamped from suitable gauge steel stock, for example. The frame plates 10 are secured together in spaced relation by spacing posts 11, the opposite ends of which are reduced and riveted or otherwise suitably secured in the opposite frame plates 10. The lower part of the frame is enclosed in a sheet metal casing 12 formed generally rectangular and overlapping at one corner, as shown in Fig. 4. The lower edges of frame plates 10 have at each of their opposite ends integral inturned feet or lugs 13 which are thereby disposed generally at the corners of the frame and between the feet 13 are suitable out-turned frame supporting lugs 14.

The feet or lugs 13 are drilled and tapped, and secured over the bottom of the frame as by bolting or screwing to these feet 13 is a bottom 15, the screws for securing the bottom 15 to feet 13 preferably carrying rubber buffers or supporting buttons 16. The margin of bottom 15 is turned up at 17 and telescopes over the lower edge of casing 12, thereby binding the bottom of casing 12 properly about the frame. A cover 18 fits over the top of the frame of the device and has depending side and end walls 19 and 20 which extend down over the sides and ends of the upper part of the frame and complete the enclosure, the rear lower edges of the depending sides and rear end of the cover telescoping over the adjacent upper edges of casing 15 and thereby binding the top of the casing properly about the frame. The upper edges of frame plates 10 have outturned margins or flanges 22 for receiving the cover and the cover is secured to these outturned margins by screws 23 which, in addition secure the "dollars and cents" plate 24 in place.

The slot or opening for receiving the check, draft or other paper is designated at 25. It extends generally horizontally from a point forwardly of the rear end of the device, wholly through the device in a transverse direction forwardly of its rear end and opens out through the front end of the device. The bottom of the check receiving slot 25 is defined by a plate 26 which projects transversely through slots 27 in frame plates 10, with its projecting margins overlying the adjacent upper edge of casing 12. The edges of said margins are turned down at 28 to give a finished appearance and facilitate insertion and withdrawal of the check. The plate 26 has lugs 29 struck downwardly therefrom and secured by screws 30 to the frame plates 10.

The top of slot 25 is defined by front and rear plates 32 and 33, which constitute supports for the type bars. Plates 32 and 33 are spaced apart along the printing line $a$—$a$ which extends transversely through the machine in the general horizontal plane of slot 25, and plate 26 has a transverse opening 35 to permit inking the printing characters and perforating and printing or impressing upon the check through said space and opening.

The type bars 38 are mounted for longitudinal sliding or shifting movement upon plates 32 and 33, said bars having depending feet 39 at their opposite ends for cooperation with the supporting plates and the printing characters 40 on the under surfaces of the type bars between feet 39 are raised above said feet so as to be free of frictional engagement with the supporting plates and other parts of the device in their shifting movement. The six type bars 38 to the left hand side (Fig. 9) of the "and" block 41 are from left to right, the hundred thousand dollar bar, the ten thousand dollar bar, the thousand dollar bar, the hundred dollar bar, the ten dollar bar, and the dollar bar, respectively. They are mounted side by side between the longitudinal "and" bar 41 and a "the sum" block 42, and each has on its under printing face from front to rear the successive characters "9, 8, 7, 6, 5, 4, 3, 2, 1, 0, $" and a limiting character in the form of a star symbol 45 (Figs. 11 to 15, inclusive), so that either a numeral character, dollar sign, or star symbol 45, may be brought into register with the printing line, the dollar sign preceding the numeral of highest order and the star symbol or symbols preceding the dollar sign to limit or stop off the left hand end of the amount impressed upon the check and thereby render more difficult the addition of characters or the alteration of the space to the left of the amount.

The two type bars 38 to the right of the block 41 (Fig. 9) are from left to right, the ten penny and penny or tens and unit of tens or cents bars. The arrangement and order of the printing characters on these bars is substantially the same as the bars to the left and they are mounted between the "and" bar 41 and a "cts." bar 48.

The bar 41 is of general I cross-section and it and the bar 48 have upwardly extending studs 50 and 52, respectively, which engage in apertures in the base of a spacer channel 54 which extends transversely between the frame plates 10 and overlies the type bars and blocks 42, 41 and 48 along the printing line. The type bars are thereby guided in their movement between the lower supporting plates and the base of the overlying channel 54 and between themselves and the blocks 42, 41 and 52, respectively. The opposite ends of the base of the channel 54 have projections 56 which extend through the side plates 10 and are riveted or headed over (Fig. 11), thereby spacing and binding the upper parts of the frame members 10 together and mounting the channel 54 securely therebetween. The engagement of studs 50 and 52 in the apertures in channel 54 secures the bars 41 and 48 firmly between the channel and the type bar supports.

Each of the type bars 38 has at its forward end a finger grip comprising a depending bracket portion 60 which lies in a vertical groove in one side of the forward end of the bar and is riveted to the bar at 62. The upwardly extending arms of the finger grips extend through parallel slots 63 in the cover 18 and have finger pieces 64 turned at right angles thereto, so that they may be conveniently grasped for manipulating the type bars back and forth.

The rear ends of the slots 63 are enlarged as shown in dotted lines in Fig. 1 so that by sliding or moving all of the type bars to their rearmost positions the cover 18 may be placed over the outstanding angular finger pieces 64 and secured in place.

The "dollars and cents" plate 24 overlies the enlarged ends of slot 63 when secured in place.

Each of the finger grips has a lateral lug 70 and secured to each of these lugs at 72 is a relatively thin indicating strip 73. The indicating strips 73 extend longitudinally and lie in a general horizontal plane just below the top of cover 18, and each strip bears numeral and symbols 75 (Fig. 3) corresponding with and in the order of the printing characters on the under surfaces of type bars 38. The free ends of strips 73 move through and are guided by slots or openings in the upstanding flange 76 of a guide member 78, and said strips move beneath windows 80 in the cover 18 to expose therethrough the printing characters or symbols which are positioned in the printing line and thereby indicate to the operator the setting of the printing characters of the machine, to apprise him of the amount that will be printed or impressed when the machine is operated, as will be pointed out. Screws 82 secure the member 78 to the cross channel 54, said screws extending through an elongated slot in member 78 which permits transverse adjustment of said member and thereby of the guide slots or openings for the strips 73, and the screws 82 also serve to clamp the block 42 securely to the under surface of the base of the channel 54, as shown in Fig. 9. The brackets 60 of the outer finger grips are offset and nested, as shown in Fig. 15, to permit mounting of the type bars in sliding engagement and uniform spacing of the projecting ends 64 of the finger grips.

To prevent the shifting of one bar from unintentionally shifting adjacent bars by frictional engagement therewith, and for holding the type bars in the positions into which they are moved, the rear end of each type bar is provided with detent means which cooperate with stationary detent means mounted within the casing and between the frame members 10 of the device. The detent means on the type bars comprises a detent finger 90 having depending lugs 92 which straddle the type bar in spaced relation to the rear end thereof and are pivoted thereon at 93. That portion of the type bar straddled by the lugs 92 is reduced as shown at 94 in Fig. 7, so that the lugs 92 will lie between the opposite sides of the bar and the upper surface of the type bar adjacent the mounting of the finger 90 and rearwardly thereof is offset downwardly as shown at 95, so that the finger 90 may lie substantially in or below the plane of the upper surface of the type bar.

The stationary detent means comprises a relatively thin sheet metal plate or aligning board 98 which lies generally horizontally between the rear portions of the frame members 10 and is corrugated transversely to form transverse detent depressions 99 in its under surface for engagement with the upwardly rounded heads 100 at the free ends of the fingers 90. The corrugated plate 98 underlies posts or pins 102 which extend transversely between the frame plates 10 and are secured at their opposite ends therein as by means of cotter pins or suitable nuts. Heads 100 of fingers 90 are normally forced upwardly into cooperation with the detent depressions in plate 98 by relatively small coiled springs 103 mounted in suitable sockets in the type bars, as shown in Figs. 6 and 8, so that as the type bars are moved from one position to another the heads 100 successively engage depressions 99 and hold the bars firmly in any adjusted position. It should be noted that the pins 102 extend through lugs 105 and thereby support the rear type cradle 33 in place between the frame members 10, and the intermediate portions 106 (Fig. 3) of the side edges of plate 98 overlie the upper edges of the upstanding margins 107 of type support 33 and thereby hold the plate 98 firmly against downward displacement.

The rear end of the forward type support 32 is mounted upon the frame by lugs 108 which extend up along the outer sides of frame member 10 and are secured thereto by screws 109. The forward portion of support 32 is mounted on the frame by lugs 110 which are struck up therefrom and apertured, and the forward set-back edges of frame plate 10 have projecting prongs or fingers 112 which extend through these apertured lugs 110. The margin of the support 32 is turned up at 115 for proper cooperation with the lower edge of the cover, and the forward portion is inclined at 118 to provide a relatively wide mouth and facilitate entry of the paper into the slot 25 from the front of the device.

For the purpose of limiting the insertion of the check or other paper into the slot 25, a pair of paper stop levers 125 and 126 are provided at opposite sides of the frame, as shown in Figs. 1, 2, 3, 5 and 11. These levers 125 and 126 are fixed upon the opposite ends of a shaft 128 extending transversely through the lower part of the frame and journaled in frame members 10. These levers project up through longitudinal slots 130 in the outstanding or projecting ledge portions 132 of plate 26 and the lever 125 has a finger piece 133 at its upper end.

The lever 126 lies within the casing 12 and cover 18, and the lower part of the lever 125 is offset at 135 to lie within the casing 12 while the upper end of said lever 125 projects upwardly from the ledge 132. The ledge 132 has a scale along the slot 130, as shown in Fig. 3, and by grasping the finger piece 33 and swinging the lever 125 to the desired setting on said scale the lever 126 will be swung or rocked as a unit therewith, and similar settings will be secured at opposite sides from one side only to limit the insertion of the paper into the slot 25 and properly position the spaces or portions of said paper to be printed, perforated or impressed in the printing and perforating line of the machine.

For the purpose of indicating the position of the printing, perforating or impressing line of the machine to facilitate proper alignment of the space or portion of the check or other paper in which it is desired to perforate, print or impress, I provide a line indicator 140 (Fig. 11). This line indicator 140 is pivotally mounted at the outer side of one of the frame members 10 upon the pin or screw 109 and it is provided with an out-turned horizontal edge 142 which indicates to the operator from the outside the position of the printing, perforating or impressing line.

The means for inking the printing characters on the under surfaces of the type bars 38 and blocks 41, 42 and 48 comprises an open arm 150 which lies in a general horizontal plane above the check receiving slot 25. The arm 150 is preferably in the form of a stamped sheet or plate having its forward edge turned up at 152 with integral lugs 153 turned back and extending rearwardly substantially parallel with the plate 150 and with a space between them and the plate. The forward edge of the horizontal base of the type support or plate 33 engages between the plate 150 and the back turned lugs 153 and thereby supports the free end of the arm 150 and guides said arm in its longitudinal shifting movement. Spot welded at 158 (Figs. 16 and 17) or otherwise suitably secured to the under surface of the forward portion of the plate or arm 150 is a plate 160 which projects forwardly beyond the arm 150, and has its forward margin turned up and inclined rearwardly at 162, said rearwardly inclined margin 162 with the forwardly inclined margin 152 of the arm 150 in spaced relation thereto providing a mounting for receiving an ink retainer designated generally at 163.

The ink retainer comprises a stamped metal ink pad holder 165 (Fig. 16) having converging marginal flanges 166 between which the ink pad of cotton or other suitable absorbent material 168 is retained. The bottom of the holder 165 has a plurality of perforations 170, and in use the pad 168 is saturated with the desired ink. A thin sheet metal shell 172 receives the holder 166 and has inclined flanges conforming with the opposite inclined marginal flanges of the holder 166 and upstanding end flanges closing off the ends of the holder. The perforated base of the holder permits excessive saturation of the pad 168 without excessive inking of the printing characters when the ink supply is fresh. The perforations provide, in effect, pockets for receiving the excessive ink between the bottom of the pad 168 and the bottom of the shell 172 and they thereby maintain the inked or moist condition of the pad 168 for a longer period than would otherwise be possible.

The upper edge of the forward upwardly inclined margin of shell 172 is turned forward slightly and the entire inking pad assembly comprising holder 166, pad 168 and shell 172 are slipped into place between converging flanges 152 and 162 of the arm 150 by endwise movement of the ink retainer transversely with respect to the arm 150 and transversely with respect to the machine. The holder has a finger piece 175 which projects transversely from the frame and casing of the machine over one of the ledges 130 for convenient access from the outside of the casing. This finger piece 175 has an upstanding apertured flange 176 which, when the operating mechanism is set with the inking pad in the printing, perforating and inking line $a$—$a$, may be conveniently grasped and the pad withdrawn for replenishing the ink supply, whereupon the ink holder may be conveniently slipped transversely into place between flanges 152 and 162 and thereby again in operating position. The frame plate 10 (Fig. 11) is notched at 178 to permit this transverse withdrawal and replacement of the ink holder, and a small upstanding lug 180 on plate 160 between flanges 152 and 162 at the end of the arm 150 opposite that from which the finger piece 175 projects (Fig. 16), limits the insertion of the ink holder and makes withdrawal and replacement possible only from the end from which the finger piece 175 projects.

The rear down turned end of arm 150 is hinged with an arm or plate 185 upon a shaft 186 between a pair of arms or links 188. The links 188 lie along the inner surfaces of frame plates 10 and are adapted for rocking or oscillation in a general vertical plane, and the plates or arms 150 and 185 are substantially the width of the distance between said links 188 with their hinge knuckles overlapping, and while free to rock or swing about the axis of shaft 186, are preferably held against axial displacement therefrom so that the inking and perforating arm assembly, when assembled, comprises a two-arm unit joined by the shaft 186.

The opposite ends of shaft 186 are journaled or suitably secured in the links 188 and the lower ends of links 188 are journaled to be rocked or oscillated upon a shaft 190 which extends transversely through the lower part of the frame and through elongated slots 192 in the frame plates 10 (Fig. 12), and are secured in arms 194.

Arms 194 constitute adjustment lock arms. They are clamped to the outer surfaces of frame plates 10 by screws 195, which extend through arcuate slots 196 in said arms 194 so that by loosening the screws 195 the slotted portions of the arms 194 may be swung in a vertical plane to adjust the positions of the ends of shaft 190 in slots 192 to adjust the axis of oscillation of links or arms 188.

The arm or plate 185 carries at its forward end the perforator which comprises two groups 200 and 201 of perforating needles, one group 200 for perforating the area of the check in which the payee's name for example, is written or impressed, and the other group 201 for perforating the area in which the amount payable, for example, is printed or impressed, in the manner more fully disclosed, for example, in the co-pending applications of George M. Willis, Ser. No. 481,632, filed June 30, 1921, and No. 563,229, filed May 24, 1922. The manner of protecting the payee's name by perforating the area in which it is written or impressed is more fully disclosed in the foregoing applications, and will not be gone into in detail here.

The needles 200 and 201, in the present case, comprise relatively thin longitudinal strips having their upper perforating edges serrated with the serrations milled, sharpened, or otherwise formed, to relatively fine sharp points. The two groups of these strips are spaced by a spacer bar 205 and the bar and two groups of strips are secured between the upstanding flanges 207 of a perforator holder 208 by a pin 206 extending therethrough, as shown in Fig. 19. The base of the channel holder 208 is spot welded or otherwise rigidly mounted upon the upper surface of the forward end of arm 185. The intermediate portion of the forward edge of arm 185 is notched at 210 and on the opposite side of the holder 208 (Figs. 18 and 19) the arm 185 has an opening 212. The flanges 207 of holder 208 are cut away adjacent the slot 210 and opening 212, and the base of the holder 208 has integral lugs 215 which project from its opposite sides and overlie the slot 210 and opening 212, respectively.

A resiliently mounted stripper 225 strips the check or other paper from the perforating points after the perforating operation. This stripper comprises an open frame having a longitudinal bar 226 (Figs. 18 and 19) which overlies the block 205 longitudinally and divides the opening in the frame into two openings, one overlying each group of perforating points. The stripper has downturned ends 228 having openings 229 into which lugs 230 integral with the holder 208 project and limit the movement of the open frame away from the perforator. Springs 232 bent down into slot 210 and opening 212 and underlying lugs 215 and held in place thereby, have free ends extending up between the side flanges 234 of the stripper, and these engage with the upper open frame of the stripper and normally urge same to its upper projected position, as shown in Fig. 19 and as determined by the stops 230.

The perforating mechanism operates beneath the slot 25, and when rocked or oscillated to perforating position and moved upwardly, as will be described, it cooperates with the under surface of the ink pad carrying arm 150 which, as already pointed out, operates above the check slot. In its upper perforating movement, the stripper cooperates with the under surface of the plate 160 of arm 150 first, limiting its movement with the check or other paper between it and the bottom of plate 160, whereupon the upward movement of the perforating needles 200 and 201 continues until said needles are projected through the open frame of the stripper, through the check or other paper and into suitable holes or sockets 240 provided in the plate 160, as shown in Fig. 17. After the perforating operations, the downward movement of the perforator withdraws the perforating needles from the socket 240 and from the paper, first, the stripper remaining in projected position under the action of springs 232, strips or removes the perforated paper from the needles, and when the limit of downward movement of the perforator arm relative the stripper is reached, the arm and stripper move together out of perforating position.

The platen arm 250 is hingedly mounted upon a shaft 252, which shaft, like the shaft 186, is journaled at its opposite ends in rocking links 253 which lie along opposite sides of the frame and are in turn mounted for rocking movement or oscillation at the lower part of the frame upon a shaft 255 which extends transversely through the frame and through elongated slots 256 in frame members 10 and is secured at its opposite ends in adjusting lock arms 258 adjustably mounted through arcuate slots 259 and screws 260 (Fig. 12) in the same manner as shaft 190, so that the shaft 255 may be adjusted in slot 256 to change the axis of oscillation or rocking movement of the links 253. The forward end of the platen arm 250 is turned up at 262, and secured to the upper surface of said arm in spaced relation to the flange 262 is an angle bracket 263 forming between it and the flange 262 a channel in which and upon an inverted channel support 264 the platen block 265 is mounted. This block may be of suitable rubber and it extends transversely through the machine for cooperation with the printing characters or symbols which are arranged in the printing line $a$—$a$.

Extending transversely between and secured at its opposite ends in rocking links 253, is a shaft 275. Extending transversely between and secured at its opposite ends in the rocking links 188 of the inking and perforating mechanism, is a similar shaft 276. The shafts 275 and 276 are connected by a pair of links 278 journaled at their opposite ends upon the opposite ends of shafts 275 and 276, respectively. The connecting links 278 extend generally longitudinally through the machine and connect the rocking links 253 and 188 so that, in effect, a unitary rocking cradle comprising the links 188, 275 and 278 is provided for the inking, perforating and printing or impressing elements, and the rocking or oscillation of this cradle is conveniently adjustable at 195 and 260, as already described.

For operating the inking, perforating and printing or impressing mechanism, an operating or crank shaft 280 is provided. This shaft extends transversely through the bottom of the frame in generally the vertical plane of the printing line, and is journaled at its opposite ends in frame plates 10. One end of this crank shaft 280 extends out and is provided with a diametrical pin 282 by means of which an operating arm or handle 283 is drivingly engaged with the crank shaft, the handle 283 having a hub 284 which fits over the projecting end of the shaft 280 and has a diametrical notch for driving engagement with the pin 282. A suitable nut 285 threaded upon the outer end of shaft 280 secures the handle 283 against displacement from the shaft, and projecting from the adjacent frame plate 10 in the path of movement of the diametrical pin 282 are a pair of 180° or diametrically opposite studs 287 which lie in the path of movement of pin 282 and limit the rotation of crank shaft 280 in opposite directions. The handle 283 has a knob 288 at its upper end.

Fixed upon the shaft 280 intermediate its opposite ends by a diametrical pin 290, is an operating or cam block 292. This block or operating cam 292 has an arcuate slot 293, the lower surface of which slot has an intermediate cam rise 294.

Extending transversely through the slot 293 is a relatively short crank connecting pin 296. A strap 300 hinged at its upper end upon a shaft 302 is bifurcated at its lower end to straddle the shifter arm and operating cam 292 and at opposite sides of said shifter arm and operating cam the lower end of said strap is hinged upon the opposite ends of the pin 296. The opposite ends of shaft 302 are secured in arms 305 which extend longitudinally through the machine and are turned up at their rear ends at 306 and mounted to swing in a vertical plane about a shaft 307 secured or journaled at its opposite ends in frame plates 10. The upper ends of arms 305 are turned out at 308 to properly space them from the frame plates 10. Journaled upon the opposite ends of shaft 302 between the opposite ends of strap 300 and the respective arms 305, are a pair of spaced pressure rollers 310 through which the perforating, inking and printing or impressing pressures are imposed. A bracket 312 extending between and secured at its opposite ends to arms 305 cooperates with a rubber covered stop post 314 extending transversely through the frame and secured at its opposite ends in frame plates 10, and this cooperation limits the downward swinging movement of the arms 305 about the shaft 307.

The forward ends of arms 305 have enlarged heads each of which is provided with a pair of generally vertical parallel slots 315 and 316. When the rocking or oscillating cradle is shifted to position the inking pad and perforator beneath the printing or line of operation $a$—$a$, the slot 315 aligns vertically with a post or shaft 318 which extends transversely between and is secured at its opposite ends in links 278 for movement to and fro with the cradle. Then, as the shaft 302 with its pressure rollers 310 is forced upwardly to provide the inking and perforating pressure, the arms 305 being carried by shaft 302 at a distance from the forward end, move upwardly therewith and engage the slot 315 over the shaft 318, thereby locking the parts against relative movement and the cradle firmly in place during the inking and perforating operation. In rocking the cradle in the opposite direction to remove the inking and perforating means from the printing line and position the platen 265 therebeneath, the shaft 318 aligns vertically with the slot 316, so that when the printing or platen impressing force is applied, the slot 316 moves up over and engages the shaft 318 and again locks the parts against relative movement and the cradle firmly in place.

A shifter arm 320 is journaled upon shaft 275 with suitable sleeves 322 between it and the opposite arms 278 for maintaining it in a central position upon shaft 275. This arm 320 is yieldably urged by a spring 323 into cooperation with the periphery of the cam or operating block 292. Its forward end lies along one side of the block 292 and has three lateral lugs 324, 325 and 326, which overlie the periphery of the block 292. The block 292 has a raised peripheral portion 330 having converging ends or noses 332 and 333, respectively. With the parts in the relative positions shown in Fig. 1, the platen is in its normal position below the printing line. By grasping the handle 283 and turning the shaft 280 in a counterclockwise direction (Fig. 11), the nose 332 engages the lateral lug 325, moving the shifter arm forwardly and with it the entire rocking cradle to move the platen from position beneath the printing line and the ink pad and perforating means in position below said line, as shown in Fig. 14. With the rotation of shaft 280 in a counterclockwise direction and the nose 332 in engagement with the lug 325, the cam periphery 335 of the raised portion of the block 292 cooperates with the lug 326 as the limit of forward oscillation is reached and swings the shifter arm upwardly and thereby releases it from the raised portion 330 of the cam block.

Thereupon, the operating block 292 and strap 300 form a toggle through which the rollers 310 are forced upwardly into engagement with the under surface of perforator arm 185 and force said arm upwardly until the stripper 225 engages the under surface of the ink pad arm. The check having been previously inserted in the check slot 25, is now positioned with the area to be impressed between the under surface of ink pad arm 150 and stripper 225. Further rotation of the block 292 forces the perforating pins through the powerful toggle action up through the open frame of the stripper through the proper areas of the check and into the holes or sockets 240 in the under surface of the ink pad arm, and simultaneously forces the ink pad arm upwardly to firmly press the inking pad 168 against the printing characters in the printing line.

The area for the payee's name and the area for the amount payable, for example, are thereby perforated, and the pressing of the ink pad against the printing characters in the printing line applies ink to the printing characters for the printing operation which follows. As the pin or shaft 296 passes past the vertical plane of shaft 280 and 302 to the left (Fig. 14), the inking and perforating pressure is released and the pressure roller, perforating means and inking means drop or are moved down to their non-perforating and non-inking positions. This is all accomplished by substantially 180 degrees rotation of the operating handle in a counterclockwise direction from its normal position, shown in Fig. 11.

With one-half the operation completed and the parts in the positions shown in Fig. 14, the handle 283 is again grasped and swung in a clockwise direction. The initial movement of the crank shaft 280 in this direction, causes the nose 333 to engage the lug 325 and shift the arm 320 longitudinally to the rear with an accompanying rearward rocking or oscillation of the entire cradle. This rearward rocking moves the inking pad and perforator back to the position shown in Fig. 11, and the platen 265 into position beneath the printing line a—a, as shown in Fig. 11. Thereupon, the cam periphery 335 cooperates with the lug 324 and lifts the shifter out of engagement with the operating block 292 and further rotation of the operating block forces the pressure rollers 310 upwardly through the powerful toggle leverage in the opposite direction, into engagement with the under surface of platen arm 250 and forces the platen into engagement with the under surface of the perforated area of the check and said perforated area up into firm printing engagement with the printing characters in the printing line, whereupon the desired characters are impressed in the perforated area.

In operation, the perforations are upset upwardly in the sheet and the type characters engage the upper upset edges of these perforations, applying the ink to said ruptured upset edges and thereby effectively into the fiber of the paper and then operating to press said upset edges back into substantially the plane of the paper. This has been found to provide maximum protection and to make alteration exceedingly difficult. The toggle leverage provides exceedingly powerful operating pressure, it is convenient and simple to manipulate, and the parts are all positive in operation. Also, the amount of movement of the parts and the relative movements of the parts may be conveniently adjusted.

The operations of inking and printing characters, perforating the check, and printing or impressing the characters thereupon, are all performed with the check remaining in one stationary position in the machine. For gripping the check or other paper and holding it firmly in this position, a pair of gripping levers are pivoted, one on each frame plate 10, by means of a suitable pivot pin 375. These levers are designated 376. They are of general bell-crank formation, comprising depending operating arms 377 and generally horizontal gripping arms 378. The free ends of arms 378 have noses 379 which are adapted to swing up through openings in plate 26 and press the check or other paper against an integral lug 380 struck out laterally from the frame plates 10.

The gripping nose 379 is normally urged to this position by a spring 382 confined between the depending arm 376 and an upright post of the open frame plate 10. For releasing the gripping arms when the parts are in their normal position as shown in Fig. 11, the operating or crank shaft 280 is provided with radial cam pins 390 which, when the operating shaft is in its normal position, engage the lower ends of arms 377 and swing the gripping noses 379 down out of gripping engagement with lugs 380. Similar gripping arrangements are provided at each side of the machine. With the initial rotation of shaft 280 to operate the machine, the arm 377 is released and the gripping noses 379 are forced upwardly under the action of spring 382 into gripping engagement with lugs 380, gripping the paper firmly between them and said lugs until the entire inking, perforating and printing operations are performed and the shaft returned to its normal position, whereupon, cam pins 390 again engage the lower end of arm 377 and release said gripping engagement.

Extending transversely through the frame beneath the perforating arm 185 and secured at its opposite ends in plates 10, is a stop post or shaft 392.

The printing characters shown are the raised type, but it is to be understood that any other suitable or preferred type of printing characters may be employed. Any suitable trade symbols or drawer's protecting symbols may be employed in connection with the "the sum" block, for example. It should be noted in Figs. 17 and 18, that the perforating pins are removed from the area of the sum block, as it is not deemed necessary to perforate that area and non-perforation lends clarity to the impression made there.

The "sum" block 42 is shown in detail in Figures 26 and 27. As already explained this block is mounted on the bottom of the left hand end (Fig. 9) of the cross channel 54 by screws 82. The "sum" characters or type 405 may be in relief or in intaglio type or otherwise and they are formed on the under surface of a relatively thin removable plate 400. The opposite longitudinal edges of this plate 400 are beveled at 402 and slidably fit in a dove-tailed groove or slot 403 recessed in the lower or under surface of the block 42. The block 42 is rigidly supported within the frame of the machine and positions the type 405 down in the horizontal plane of the other printing characters. The opposite edges of the inner end of plate 400 are scarfed at 406 and the portion between said scarfed edges projects on into close proximity to the adjacent type bar to position the type or characters 405 adjacent thereto. The opposite end of the plate 400 is apertured at 408 to facilitate its removal. The plate 400 is readily removable from the block 42 so that different plates bearing different symbols or characters may be interchanged. The formation of the ends of the plate 400 positions the characters thereon in close proximity to the adjacent type bar and permits convenient removal of the plate from outside the casing of the machine which has an opening 143 (Fig. 9) which permits access to the projecting apertured end of plate 400.

While I have described my invention in connection with the details of a particular embodiment, it is to be understood that the invention is not limited to such details, and that various modifications and changes are contemplated within the scope of the appended claims.

I claim:

1. In a device of the class described, a shaft adapted for rocking movement in opposite directions, an oscillating cradle, and an arm for shifting said cradle in opposite directions by means of said shaft.

2. In a device of the class described, a shaft adapted for rocking movement in opposite directions, an oscillating cradle, a shifting arm pivoted to said cradle, and cooperating means on said arm and said shaft for shifting the cradle in opposite directions through said arm by rocking movement of said shaft.

3. In a device of the class described, a shaft adapted for rocking movement in opposite directions, an oscillating cradle, a cradle shifting arm overlying said shaft, an operating member on the shaft, lug means on said operating member, and spaced lugs on said shifting arm in the path of movement of said first lug means.

4. In a device of the class described, the combination of a rock shaft, an oscillating cradle, a cradle shifting arm overlying said shaft, an operating member on said shaft, cooperating lug means on said operating member and on said shifting arm, lifting means, and a toggle connection between said lifting means and said shaft.

5. In a device of the class described, a rock shaft, an oscillating cradle, a cradle shifting arm overlying said shaft, an operating member on said shaft, cooperating lug means on said operating member and on said shifting arm, lifting means having lost motion connection with said shaft through said operating member, and means for tripping out said shifting arm at the limit of oscillation of the cradle.

6. In a device of the class described, a rock shaft, an oscillating cradle, a cradle shifting arm, and cooperating lug means between the shaft and said arm for shifting the cradle in oppoiste directions therethrough.

7. In a check writer the combination of a plurality of type bars having printing characters for selective positioning in a printing line, interconnected platen, inking and perforating means, a lifting roller, means for shifting said platen and perforating means alternately into position overlying said roller, and means for lifting said roller to raise said platen and perforating means alternately to operative position.

8. In a check writer the combination of a plurality of type bars having printing characters for selective positioning in a printing line, interconnected platen, inking and perforating means, a lifting roller, means for shifting said platen and perforating means alternately into position overlying said roller, an operating shaft, and a toggle connection between said lifting roller and said operating shaft.

9. In a check writer, the combination of a plurality of type bars having printing characters for selective positioning in a printing line, interconnected platen, inking and perforating means, a lifting roller, means for shifting said platen and perforating means alternately into position overlying said roller, an operating shaft, a toggle connection between said lifting roller and said operating shaft, said toggle connection having a lost motion connection with the shaft, and means for tripping out the shifting means as the platen and perforating means are positioned in the printing line.

10. In a check writer the combination of a casing for receiving a thin sheet, a plurality of type bars having printing characters for selective positioning in a printing line within the casing, a rock shaft, interconnected platen, inking and perforating means for positioning below the printing line in predetermined sequence, means for lifting said platen, inking and perforating means into operative position, and means on said lifting means for locking said interconnected platen, inking and perforating means against shifting movement during the lifting operation.

11. In a check writer the combination of a casing for receiving a check, a plurality of type bars having printing characters for selective positioning in a printing line within the casing, a rock shaft, a cradle comprising upright links having relatively stationary pivotal support at opposite ends of the casing, a platen arm hinged to one of said links, a perforator arm and an overlying inking pad arm hinged to the other of said links, a longitudinal connecting link between said first links, a lifting arm having relatively stationary pivotal support within the casing, and a shifting arm having means cooperable with means on the rock shaft for shifting the platen and the inking pad and perforator alternately into position below the printing line.

12. In a check writer the combination of a casing for receivng a check, a plurality of type bars having printing characters for selective positioning in a printing line within the casing, a rock shaft, a cradle comprising upright links having relatively stationary pivotal support at opposite ends of the casing, a platen arm hinged to one of said links, a perforator arm and an overlying inking pad arm hinged to the other of said links, a lifting arm having relatively stationary pivotal support within the casing, a shifting arm having means cooperable with means on the rock shaft for shifting the platen and the inking pad and perforator alternately into position below the printing line, and a toggle connection between the lifting arm and the rock shaft.

13. In a device of the class described a rock shaft, an oscillating cradle, an arm for shifting said cradle, cooperating means on said arm and said shaft for actuating said arm by means of said shaft, and means for tripping out said actuating means at the limit of the movement of the cradle to permit further rocking of the shaft independently thereof.

14. In a device of the class described, the combination of a rock shaft, an oscillating cradle, means for shifting the cradle by rocking movement of the shaft, and means for tripping out said shifting means at the limit of movement of the cradle to permit continued rocking of the shaft independently of said shifting means.

15. In a device of the class described, the combination of a rocking shaft, an oscillating cradle, means for shifting said cradle by rocking movement of the shaft, and means for locking the cradle at the limits of its shifting movement.

16. In a device of the class described, the combination of a rocking shaft, an oscillating cradle, means for shifting said cradle by rocking movement of the shaft, and means for locking the cradle at the limits of its shifting movement, said locking means being set by said shaft at the limit of its rocking movement and being released upon the initial rocking movement of the shaft.

17. In a device of the class described the combination of a casing, an oscillating frame therein, a shaft for oscillating said frame, a locking arm pivoted in the casing, means on the frame for cooperation with said arm to lock the frame in shifted position, and means on the shaft for moving said arm into locking engagement with said last means.

18. In a device of the class described, the combination of a casing, a cradle therein, locking means for said cradle, and common means for shifting said cradle and for setting said locking means to lock the cradle in shifted position.

19. In a device of the class described, the combination of a casing, a cradle therein, a locking arm, means on the cradle for locking engagement with said arm, means for shifting the cradle, and means for elevating said locking arm into engagement with the cooperating locking means on the cradle.

20. In a device of the class described, the combination of a casing, a cradle mounted for oscillation therein, a locking arm pivoted within the casing, cooperating locking means on the cradle, means for shifting the cradle alternately in opposite directions, and means for elevating said locking arm into locking engagement with said cooperating locking means at the limits of oscillation of the cradle.

21. In a device of the class described, the combination of an oscillating cradle, a rocking shaft, means for shifting the cradle by rocking movement of the shaft and a lost motion connection between the shaft and said shifting means.

22. In a device of the class described, the combination of a plurality of printing members having printing characters for selective arrangement in a printing line, an oscillating frame, a platen carried by said frame, a perforator carried by said frame, and a shifting arm independent of said platen and perforator for shifting said frame by rocking movement of said shaft.

23. In a device of the class described, the combination of a plurality of printing members having printing characters for selective arrangement in a printing line, an oscillating frame, a platen carried by said frame, a perforator carried by said frame, a shifting arm independent of said platen and perforator for shifting said frame by rocking movement of said shaft, and a lost motion operating connection between said arm and said shaft.

24. In a check writer the combination of a plurality of printing members having printing characters for selective positioning in a printing line, an interconnected platen, inking pad and perforator, means for shifting said platen, inking pad and perforator into operative relation in predetermined sequence, lifting means for said platen, inking pad and perforator, an operating shaft, and a toggle connection between said lifting means and said shaft.

25. In a check writer the combination of a plurality of printing members having printing characters for selective positioning in a printing line, an interconnected platen, inking pad and perforator, means for shifting said platen, inking pad and perforator into operative relation in predetermined sequence, lifting means for said platen, inking pad and perforator, an operating shaft, a toggle connection between said lifting means and said shaft, and a lost motion connection between said shaft and said shifting means.

26. In a device of the class described, the combination of a rock shaft, a shiftable cradle, a pivoted arm, means for shifting the cradle and for lifting said arm by rocking movement of said shaft, and means for tripping out said shifting means to permit lifting of said arm independently of shifting of the cradle.

27. In a device of the class described, the combination of a casing, an oscillating frame having an arm pivoted within the casing and means for adjusting the position of the pivot for said arm to adjust the oscillation of said frame.

28. In a device of the class described, a casing, a relatively fixed frame therein, a shiftable frame having interconnected generally upright arms pivoted on said fixed frame, means for adjusting the position of the pivots of said arms and platen, inking and perforating means carried by said shiftable frame.

29. In a check writer, having a check receiving opening, an abutment adjacent said opening, a main operating shaft, a lever pivoted below said opening, said lever being yieldably urged into co-operation with said abutment to grip a check therebetween and having direct engagement with said main operating shaft for disengagement thereby.

30. In a check writer, the combination of a casing, a frame therein, a shiftable cradle having upright arms pivoted on said frame and a connecting arm between them, platen, inking and perforating means carried by said cradle, an operating shaft, an operating member on said shaft having a slot and projecting pallet means, a shifting arm connected to the cradle and co-operable with said pallet means, and lifting means for the platen, inking and perforating means, said lifting means having a toggle connection with the operating shaft through the slot in said operating member.

31. In a check writer, the combination of a shiftable frame, perforating mechanism carried by said frame, a printing platen carried by said frame, operating mechanism for shifting said frame, and means for locking said frame at the limit of its shifting movement.

32. In a check writer, the combination of a plurality of printing members having type characters adapted to be brought into registration with a printing line in said check writer, an abutment on each side of the check writer, a holding member on each side of the check writer and co-operable with said abutments to grip and hold a check therebetween, an operating shaft, and cam means mounted on said shaft and having direct co-operation with said holding members for releasing same.

33. In a check writer, the combination of a shiftable printing member, a relatively fixed member for holding said printing member in printing position, and a spring pressed detent arm pivoted on the printing member and co-operable with said holding member.

34. In a check writer, the combination of a transversely corrugated aligning member, a plurality of shiftable printing members movable normal to the corrugations in said aligning member, and spring pressed arms pivoted on the printing members and co-operable with said aligning member to hold the printing members in printing position.

35. In a check writer, the combination of a frame comprising two parallel frame plates, a cross member extending between and secured at its ends to said frame plates, printing members shiftable beneath said cross member, a guide on said cross member and indicating slides carried by said printing members and shiftable through said guide member, said indicating slides being each secured at one end to said printing members and extending in one direction only from the attachment to the printing members, the guide member being cooperable with the opposite ends of said slides to guide and support same.

36. In a check writer, the combination of a housing having a check receiving opening, a plate overlying and defining the top of said opening, and a printing member shiftably mounted on said plate.

37. In a check writer, the combination of a housing having a check receiving opening and a printing line, a pair of plates overlying and defining the top of said opening, said plates being spaced apart along the printing line, and a plurality of printing members having printing characters adapted to be brought selectively into the printing line, said printing members extending across the space between said plates and slidably supported upon said plates at opposite sides of said space.

38. In a check writer, the combination of a housing having a check receiving opening and a printing line, a plate underlying and defining said opening, said plate being open along the printing line to permit lifting of a platen and perforating mechanism therethrough, a pair of plates overlying said opening and spaced along said line, and a plurality of type bars lying above said second plates and having supporting feet at their opposite ends slidably mounted thereon.

In witness whereof, I hereunto subscribe my name this 20th day of October, 1924.

ARTHUR H. WOODWARD.